Sept. 19, 1967     J. K. HULING     3,342,382
PRESSURED DISPENSER SPOUT HAVING PLURALITY
OF DECORATOR ORIFICES
Filed Oct. 22, 1965
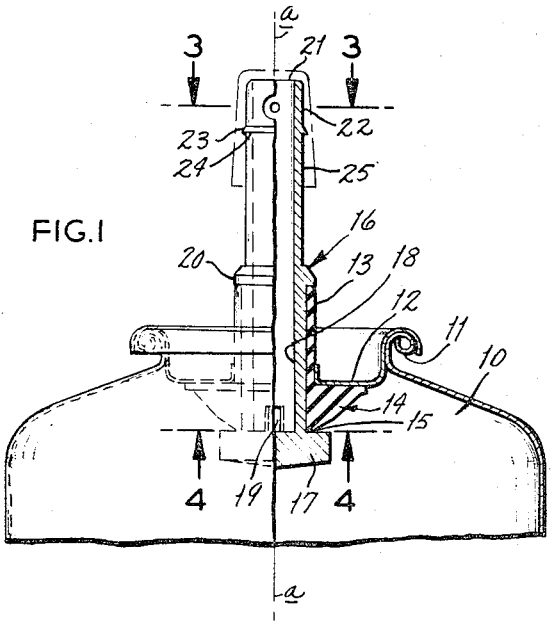
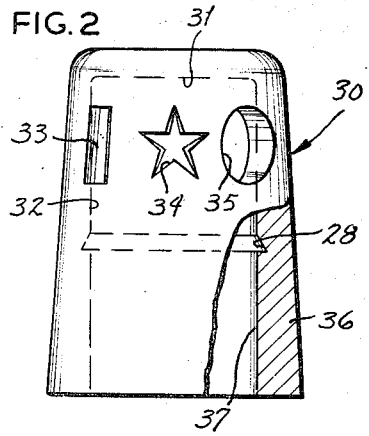
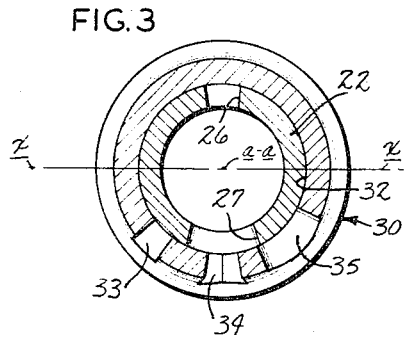
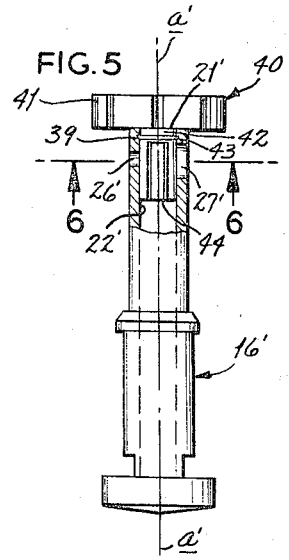
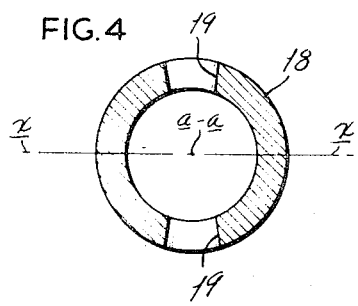
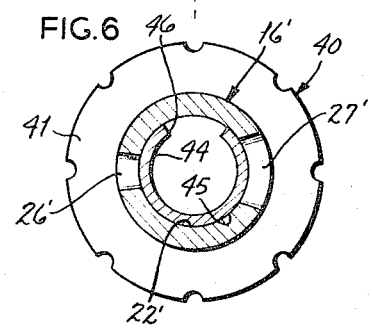
INVENTOR
JAMES K. HULING
BY
ATTORNEY United States Patent Office 3,342,382
Patented Sept. 19, 1967

3,342,382
PRESSURED DISPENSER SPOUT HAVING
PLURALITY OF DECORATOR ORIFICES
James K. Huling, Belleville, Ill., assignor to The Clayton Corporation of Delaware, St. Louis, Mo., a corporation of Delaware
Filed Oct. 22, 1965, Ser. No. 501,581
2 Claims. (Cl. 222—402.17)

ABSTRACT OF THE DISCLOSURE

Multiple decorative orifice patterns for extruding products such as cake icings from pressurized dispensers, are provided in a single molded dispensing tip assembly, having only two plastic parts. One, a tubular valving spout, has stem inlets and outlets both molded perpendicular to its parting plane and a rounded sealing surface. The other, a cap-like member fitted on the sealing surface, has outlet orifices which on rotation may be brought into angular registration with one or another of the spout outlets.

---

The present invention relates to a dispensing valve and tip closure for food products such as decorative cake icings and the like, which are packed so as to be dispensed extrudably under gas pressure. Such foods are likely to harden when exposed to the air, and should be sealed therefrom. Furthermore, it is desirable to dispense them in decorative form, requiring one or more decorative openings which are likely to become wholly or partially clogged if portions of the food are permitted to harden therein.

The purposes of the present invention are to provide a simple, readily molded valve spout and a sealing cover for its tip, reliably usable with familiar pressure dispensing containers, which by rotatable adjustment of the sealing cover will either seal the food in the spout from air, which would cause it to harden, or will selectively bring into registration a choice of decorative dispensing openings.

In the present invention these objects are achieved generally by providing a valve of the type which is mounted in a tubular rubber seal having an annular sealing face against which a valve head, within the container, will seal. The spout member of such valve, including its head, inlet and preferably a pair of lateral dispensing outlets, is conveniently formed by molding. This is accomplished by forming the outlets perpendicularly to the parting plane of the molded stem, just as the stem inlets are formed. Such dispensing outlet apertures extend through a surface of revolution near the stem tip. A sealing member closes the tip of the stem, and has a sealing surface of revolution fitted complementarily to the surface of revolution of the stem. One or more dispensing openings interrupting its surface of revolution permit the flow of the food from the dispenser through a stem opening, when an opening of the sealing member is brought angularly into registration with it. When in closed position, the sealing member seals off the stem from the outside air, preventing the food from hardening in the stem.

The sealing member may take on a variety of forms. For example, it may have the form of an external cap, whose center portion closes the tip of the stem, and whose skirt portion is penetrated by one or more openings which may be brought into and out of registration with the lateral dispensing outlets of the stem. Alternately, it may be a rotatable plug having an enlarged end which closes the stem and by which it may be turned angularly to selectively direct the food product through one of two diametrically opposite openings through the stem near its tip, or to close off such openings.

In either case a variety of "decorator tip" shapes are made possible. In both, the valve stem itself is employed as one of the two parts which together achieve both the decoration-forming and the valving and sealing functions.

In the accompanying drawings:

FIG. 1 is a side view of a preferred embodiment of the present invention, the left half being in elevation and the right half in section.

FIG. 2 is an enlarged view of the cap member of FIG. 1, the lower right portion thereof being shown in section.

FIG. 3 is an enlarged cross-sectional view of the spout and cap member taken along line 3—3 of FIG. 1.

FIG. 4 is a similarly enlarged cross-sectional view of the spout taken along line 4—4 of FIG. 1.

FIG. 5 is a side view, partly in elevation and partly in section, showing a modified embodiment of the present invention.

FIG. 6 is an enlarged sectional view taken along line 6—6 of FIG. 5.

Referring now to FIG. 1, there is shown a familiar single use dispensing container generally designated 10 having a rimmed mouth 11 into which is crimped and sealed a conventional centrally apertured valve mounting cup 12. Through the aperture of the cup 12 projects the sealing sleeve portion 13 of a valve seal generally designated 14 formed of rubber-like material and having within the container an annular seat 15.

Sealedly mounted within the rubber-like seal 14 for closing and opening relative to the annular seat 15 is a dispensing spout generally designated 16, formed preferably of a hard plastic material by molding to the shape shown and with the features of construction hereinafter described. The spout 16 is used both for valving and dispensing. It is tubular, having a longitudinal axis $a—a$ and various surface portions, hereinafter referred to, formed as surfaces of revolution about said axis. Such a spout 16 is formed in the familiar type of mold which has a parting plane $x—x$ in which the axis $a—a$ lies, as shown in FIGS. 3 and 4.

At the base of the spout 16 is a radially enlarged head portion 17 adapted to be presented sealedly against the annular seat 15 of the rubber-like seal 14, and openable therefrom by tilting movement of the spout 16. Immediately above and adjacent to the head portion 17, the spout 16 includes a hollow cylindrical base portion 18 which is sealedly mounted within the sleeve portion 13 of the rubber-like seal 14, the latter providing sealing as between the spout 16 and the flanged aperture of the mounting cup 12. Adjacent to the head 17 and directed inwardly perpendicular to the parting plane $x—x$, as shown in FIG. 4, are lateral inlets 19 to provide communication for the container contents into the tubular interior of the dispensing spout 16.

An outward projecting stem shoulder 20 provides an abutment for the outward end of the sleeve 13 of the rubber-like seal 14.

Above its hollow cylindrical base portion 18, the spout is tubular. Its outer end presents an annular upper surface 21; beneath and adjacent to it the stem has a smooth surface portion 22 formed as a surface of revolution about the axis $a—a$. In the embodiment shown, the surface portion 22 slopes slightly outward and downward. Its lower extent is demarked by an outwardly projecting ridge 23 whose under-surface 24 provides a shoulder; a second smooth surface of revolution 25 is provided beneath the shoulder 24. The sectional view FIG. 3 is taken through the first-mentioned surface of revolution 22.

Lateral dispensing apertures, preferably of two different sizes such as the smaller dispensing aperture 26 and the larger dispensing aperture 27, are provided diametrically opposite to each other as shown in FIG. 3. These project perpendicularly to the parting plane x—x precisely as do the lateral inlets 19 shown in FIG. 4. It is to be understood that the sloping sides of the inlets 19 and the dispensing apertures 26, 27 provide a draft angle merely for easy tooling and easy removal from the molded projections which form them; otherwise they might be themselves perpendicular to the parting plane x—x. The phrase "extending perpendicular to said parting plane," as used in the claims, it means the general positioning of said inlets and outlets, and does not require that their sides be themselves perpendicular to the parting plane. The essential feature is that, being located perpendicular to the parting plane, although near opposite ends of the stem, they permit easy molding of the stem to provide both flow inlet and flow outlet provisions.

Fitted closely onto and against the annular upper surface 21 at the spout tip and the adjacent smooth surface portion 22, and having a grooved undercut 28 to fit onto the ridge 23, is an angularly movable spout sealing member generally designated 30, shown enlarged in FIG. 2. This sealing member is in the form of a cap, having an upper cap surface 31 which fits against the annular upper surface 21 of the spout tip and closes the dispensing spout; and further having an inner surface of revolution 32 which fits closely complementarily to the smooth surface portion 22, thus to provide an airtight seal when turned about 60° from the position shown in FIG. 3 to close all the dispensing outlet apertures. However, as shown in FIGS. 2 and 3, its sealing surface of revolution is penetrated by three decorating type flow openings here grouped at approximately 45° intervals. Those openings illustrated are a slot 33, a star 34, and a circle 35. The precise form of the decorator flow openings 33, 34, 35 may be varied; those chosen are illustrative of the several types which may be desired to provide for the extrusion of cake icings in attractive cross-sections.

Below the openings 33, 34, 35, the cap member 30 has a skirt 36 whose inner surface of revolution 37 fits closely against the surface of revolution; the depth of the skirt 36 permits easy manipulation.

The close fit of the cap member 30 on the dispensing spout 16, as provided by the fit of its grooved undercut 28 into the projecting ridge 23, and the close fit of the complementary surfaces of revolution 22, 32 and 25, 37, excludes air when the member 16 is turned to closed position. Any decorative cake icing remaining in the stem will thus be sealed from exposure to the air and this will not harden.

It is further to be noted from FIG. 3 that the slot, star or circle openings 33, 34, and 35 may be selectively brought into registration either with the larger dispensing outlet aperture 27 or the smaller dispensing outlet aperture 26. The choice between these two will provide a modification of the size of the extruded mass of product. However, since only one of the dispensing outlet apertures 26, 27 may be used at a time, it may be desired to mold only one of them.

Referring now to FIGS. 5 and 6, the alternate form of invention includes a similar container 10, valve mounting cup 12 and seal 14, not illustrated. The spout 16' is formed like the spout 16, except that instead of having an exterior ridge 23 it has close to the angular upper surface 21' at its tip, an interior undercut 39, located outwardly of the dispensing outlet openings 26', 27'. Another difference of significance is that its smooth surface of revolution 22' is the inner surface of the tubular spout 16' rather than its outer surface.

Fitted within the tip of the dispensing spout 16' is an angularly movable plug-like sealing member generally designated 40. It consists of a button-like head portion 41 whose lower surface is presented securely and sealedly against the tip 21', a short plug projection 42 within the spout tip 21' and having a ridge 43 which fits against the undercut 39, and a depending slotted tubular portion 44 whose outer wall 45 is smoothly formed as a surface of revolution to seal tightly against the inner surface of revolution 22' of the spout 16'. The slot 46 in the slotted tubular portion 44 extends from the plug projection, and is large enough to provide full flow to the larger dispensing outlet aperture 27'.

In operation the plug-like sealing member 40 may be positioned as illustrated in FIG. 5, for sealed closing of both of the dispensing outlet apertures 26', 27', in which case air will be excluded from the interior of the spout. By rotating the member 40 by means of the button-like head portion, the slot 46 is brought into registration with either the smaller dispensing outlet aperture 26' or the larger dispensing outlet aperture 27'. If desired, both these apertures 26', 27' may be given ornamental shapes such as those of the embodiment heretofore described.

In both the embodiments, forming the lateral dispensing outlet apertures 26, 26', 27 and 27' perpendicular to the parting plane of the stem, just as the stem inlets 19 are formed near its opposite end, makes possible the unique simple molded construction whereby the functions of valving, decorator tip dispensing and sealed closing from the air are selectively achieved.

The manner of dispensing will be apparent. With the cap 30 or plug member 40 turned to chosen dispensing position, the container is substantially inverted, the valve spout 16 or 16' is tilted laterally, the contents of the container flow into the spout 16 or 16' through the inlets 19 and out through the selected dispensing outlet openings 26, 27, 26', 27', and the registering opening in the cap 30 or plug member 40. Release of the lateral pressure closes the valve; and the member 30, 40, is then rotated angularly to closed sealed position.

In view of this disclosure, modifications in detail will be obvious to those familiar with the art who desire to achieve the purposes hereof. Accordingly this specification should not be construed narrowly, but rather as fully co-extensive with the claims.

I claim:

1. A two-piece molded valving spout and sealing decorator tip assembly for selectively sealing and decoratively dispensing extrudable food products, and the like, packed under gas pressure, comprising a valve spout of the type having a central axis and a parting plane in which said axis lies, and having a stem portion and a head portion at its inner end, and having a lateral inlet into the stem portion adjacent to the head portion, said inlet extending perpendicularly to such parting plane, characterized in having at the outer end of the stem portion an open tip, a surface adjacent thereto formed as a surface of revolution about such axis, and a lateral dispensing outlet aperture extending perpendicularly to said parting plane through said surface of revolution, in combination with a cap-like spout tip sealing member having a surface of revolution fitted complementarily to the stem surface of revolution, and a lateral aperture therethrough, said tip sealing member being characterized in having an upper cap surface whereby the open tip of the valve spout member is closed, the said combination having integral rotation-permitting means to secure the sealing member in fixed axial position on the spout member with their lateral apertures in axial registration and their said surfaces of revolution in contact, whereby to resist the force of extrusion of such a product, and having a second axially registering aperture through one of said surfaces of revolution, said second aperture being of decorative configuration.

2. A two-piece molded valving spout and sealing decorator tip assembly as defined in claim 1, further characterized in that the other of said surfaces of revolution also has a second axially registering aperture of a size differing in size from its first aperture and in that the angular spacing of the apertures of one said surfaces of revolution differs from the angular spacing of the apertures of the other, whereby on angular positioning of said sealing member relative to said stem, no more than one of the apertures through one of said surfaces of revolution may be brought into angular registration with an aperture through the other surface of revolution.

References Cited

UNITED STATES PATENTS

| | | | |
|---|---|---|---|
| 2,615,597 | 10/1952 | Tomasek et al. | 222—402.22 |
| 2,887,273 | 5/1959 | Anderson et al. | 222—402.17 |
| 2,997,243 | 8/1961 | Klob | 222—402.17 X |
| 3,083,872 | 4/1963 | Meshberg | 222—402.17 X |
| 3,170,633 | 2/1965 | Castelli | 222—485 X |

FOREIGN PATENTS

| | | |
|---|---|---|
| 252,046 | 5/1926 | Great Britain. |

ROBERT B. REEVES, *Primary Examiner.*

HADD S. LANE, *Examiner.*